United States Patent
Wang et al.

(10) Patent No.: US 11,180,390 B2
(45) Date of Patent: Nov. 23, 2021

(54) METHOD FOR TREATING AND RECYCLING WASTE SLURRY IN BOBBIN PAPER PRODUCTION

(71) Applicant: Jiangnan University, Wuxi (CN)

(72) Inventors: Shuo Wang, Wuxi (CN); Qianqian Yang, Wuxi (CN); Ji Li, Wuxi (CN); Tang Tang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 8 days.

(21) Appl. No.: 16/337,502

(22) PCT Filed: Jul. 14, 2017

(86) PCT No.: PCT/CN2017/092959
§ 371 (c)(1),
(2) Date: Mar. 28, 2019

(87) PCT Pub. No.: WO2018/036300
PCT Pub. Date: Mar. 1, 2018

(65) Prior Publication Data
US 2020/0270154 A1 Aug. 27, 2020

(30) Foreign Application Priority Data

Aug. 25, 2016 (CN) .......................... 201610722942.X

(51) Int. Cl.
*C02F 3/12* (2006.01)
*C02F 3/00* (2006.01)
*C02F 103/28* (2006.01)

(52) U.S. Cl.
CPC ............ *C02F 3/121* (2013.01); *C02F 3/1226* (2013.01); *C02F 3/1263* (2013.01);
(Continued)

(58) Field of Classification Search
None
See application file for complete search history.

(56) References Cited

U.S. PATENT DOCUMENTS

| 4,568,462 A | * | 2/1986 | Bohnke ................... C02F 3/121 |
| | | | 210/605 |
| 5,395,527 A | * | 3/1995 | Desjardins ............ C02F 3/1263 |
| | | | 210/608 |

(Continued)

OTHER PUBLICATIONS

Bassin, et al., Ammonium adsorption in aerobic granular sludge, activated sludge, and anammox sludge granules, Water Res., 45 (2011) 5257-5265 (Year: 2011).*

(Continued)

*Primary Examiner* — Chester T Barry
(74) *Attorney, Agent, or Firm* — IPro, PLLC

(57) ABSTRACT

The present invention relates to the technical field of environmental engineering, and particularly relates to a method for treating and recycling waste slurry in bobbin paper production. The present invention employs aerobic granular sludge technology-based two-stage process of treating and recycling waste slurry in bobbin paper production, and has features of low agent feeding, small floor space occupation, a short operating cycle, and easy controllability. By treating a high-load waste slurry in an adsorption section having aerobic granular sludge, fibrous materials in the waste slurry can be concentrated efficiently and resource substances can be recycled. By treating water discharged from the adsorption section with aerobic granular sludge in a biochemistry section, a water release can be guaranteed to stably meet the standard. By employing the method, the amounts of the fibrous materials and proteins adsorbed by the aerobic granular sludge in the adsorption section reach 710 mg/g MLSS and 140 mg/g MLSS respectively, the concentrations of COD, $NH_4$-N, TP and SS of water released from the (Continued)

biochemistry section are 98 mg/L, 4.1 mg/L, 0.8 mg/L and 100 mg/L respectively, and the removal rates of COD and SS reach 98.8% and 96.2% respectively, enabling water release to meet a corresponding release standard.

8 Claims, 4 Drawing Sheets

(52) U.S. Cl.
CPC .... *C02F 2003/001* (2013.01); *C02F 2103/28* (2013.01); *C02F 2301/046* (2013.01)

(56) References Cited

U.S. PATENT DOCUMENTS

| | | | | |
|---|---|---|---|---|
| 5,846,425 | A * | 12/1998 | Whiteman | C02F 11/18 210/606 |
| 5,853,589 | A * | 12/1998 | Desjardins | C02F 3/1263 210/605 |
| 6,312,599 | B1 * | 11/2001 | Reid | C02F 3/308 210/605 |
| 7,875,181 | B2 * | 1/2011 | Ong | C02F 3/1263 210/616 |
| 8,778,135 | B2 * | 7/2014 | Li | D21C 11/02 162/29 |
| 10,294,136 | B2 * | 5/2019 | Phillips | C02F 3/34 |
| 2002/0139747 | A1 * | 10/2002 | Gantzer | C02F 3/301 210/605 |
| 2012/0018374 | A1 * | 1/2012 | Sun | C02F 3/308 210/605 |
| 2013/0140232 | A1 * | 6/2013 | Fabiyi | C02F 3/26 210/604 |
| 2018/0002208 | A1 * | 1/2018 | Larsen | C02F 3/302 |

OTHER PUBLICATIONS

Xiao-ying Zheng, Yu-jie He, Wei Chen, Ming-yang Wang, Su-lan Cao, Ming Ni & Yu Chen (2016) A comparative adsorption study: 17β-estradiol onto aerobic granular sludge and activated sludge, Environmental Technology, 37:1, 136-144, DOI: 10.1080/09593330. 2015.1065004 (Year: 2016).*

Zheng et al., Physical and chemical characteristics of granular activated sludge from a sequencing batch airlift reactor, Process Biochem., vol. 40, Issue 2, Feb. 2005, 645-650 (Year: 2005).*

* cited by examiner

METHOD FOR TREATING AND RECYCLING WASTE SLURRY IN BOBBIN PAPER PRODUCTION

TECHNICAL FIELD

The disclosure herein relates to a treatment and recovery method for bobbin paper production wastewater, and belongs to the technical field of environmental engineering.

BACKGROUND

The bobbin paper is important industrial paper, has good wear resistance, water resistance and air permeability and higher strength and hardness, and is currently applied to the textile industry, metallurgical industry, construction industry, etc. However, the preparation process of the bobbin paper relying on the papermaking industry produces a large amount of waste slurry in production, so that under the conditions that the amount of wastewater is increasing, the treatment and disposal technique is still not perfect and the treatment and disposal standards are gradually strict, the treatment technique of the bobbin paper production wastewater is particularly important. In addition, because the bobbin paper production wastewater has higher-concentration COD and suspended solids and the suspended solids contain a large amount of substances such as waste paper fiber and plant fiber, it is suitable for recovering the resource type substances in the waste slurry while treating the bobbin paper production wastewater.

During treatment on the bobbin paper production wastewater, a mode of coagulating sedimentation/air flotation, anaerobic treatment and aerobic treatment is adopted generally. By adopting this technology, the chemical addition amount is increased, and because the treatment technology and the operating period are longer, the technology adjustment and control difficulty and the operating costs are obviously increased. Furthermore, this technology does not recycle the resource type substances, which greatly restricts the development of the treatment and recycling technique of the bobbin paper production wastewater.

SUMMARY

In order to solve the problems of higher energy consumption and chemical consumption and poor resource recovery effect in the treatment process of bobbin paper production wastewater, the present invention establishes a two-stage treatment technology for bobbin paper production wastewater based on the aerobic granular sludge technique, detects the recovery efficiency of the aerobic granular sludge on the fiber type substances and the stability of waste slurry treatment, and lowers the operating costs. The present invention provides the optimal operating parameters of a two-stage treatment system, and provides a theoretical basis and a technical support for treatment and recovery of the bobbin paper production wastewater.

The treatment and recovery method for bobbin paper production wastewater comprises the following steps: inoculating aerobic granular sludge in an adsorption tank and a biochemical reaction tank, and starting a reaction; after the starting period is finished, enabling the bobbin paper production wastewater to firstly enter the adsorption tank, so that suspended solids in the waste slurry are adsorbed by the aerobic granular sludge in the adsorption tank, then enter a balance tank to be subjected to nitrogen and phosphorus treatment, and then enter the biochemical reaction tank to be subjected to sequencing batch treatment under the action of the aerobic granular sludge; and then, discharging the treated water.

In an example of the present invention, the annual average COD and SS concentrations of the bobbin paper production wastewater are 8200-9000 mg/L and 2300-2900 mg/L respectively.

In an example of the present invention, the dissolved oxygen in the adsorption tank and the biochemical reaction tank is controlled at 0.2-0.8 mg/L and 2.0-3.0 mg/L respectively.

In an example of the present invention, the hydraulic retention time of the adsorption tank and the biochemical reaction tank is 1 h and 3 h respectively.

In an example of the present invention, the MLSS, MLVSS and SVI of the inoculated aerobic granular sludge are 7.1 mg/L, 3.5 mg/L and 57.0 mL/g respectively.

In an example of the present invention, the sludge in the biochemical reaction tank returns to the adsorption tank.

In an example of the present invention, the aerobic granular sludge in the adsorption tank is taken out regularly to recover fiber type substances and/or protein type substances, and the taken aerobic granular sludge can be recycled.

In an example of the present invention, the aerobic granular sludge taken from the adsorption tank can be dried and dehydrated to be incinerated to generate heat, can also be subjected to anaerobic digestion to generate biogas, or can be used as a raw material of bobbin paper in the production technology of bobbin paper.

In an example of the present invention, when the adsorption capacities of the fiber type substances and the protein type substances in the aerobic granular sludge in the adsorption tank reach 710 mg/g MLSS and 140 mg/g MLSS respectively, the aerobic granular sludge in the adsorption tank is fully or partially taken out regularly, and then, the sludge generated in the biochemical reaction tank is used for supplementing.

In an example of the present invention, $NH_4Cl$ and $K_2HPO_4$ are respectively added to the balance tank according to a ratio of COD:N:P=100:5:1 to perform nitrogen and phosphorus adjustment, thereby ensuring the microbial growth in the biochemical reaction tank.

In an example of the present invention, the time of the starting period is 40-60 d.

In an example of the present invention, starting the reaction is that the bobbin paper production wastewater enters the adsorption tank, then enters the balance tank and is subjected to nitrogen and phosphorus treatment, and then enters the biochemical reaction tank and is treated. The dissolved oxygen in the adsorption tank and the biochemical reaction tank is controlled at 0.2-0.8 mg/L and 2.0-3.0 mg/L respectively. The hydraulic retention time of the adsorption tank and the biochemical reaction tank is 1 h and 3 h respectively. Nitrogen and phosphorus adjustment is performed in the balance tank according to a ratio of COD:N:P=100:5:1.

In an example of the present invention, both the adsorption tank and the biochemical reaction tank adopt a mode of bottom water feeding and bottom aeration.

In an example of the present invention, the diameter of the adsorption tank is 40 cm, the height of the adsorption tank is 120 cm, and the effective volume of the adsorption tank is 500 L; the diameter of the biochemical reaction tank is 20 cm, the height of the biochemical reaction tank is 120 cm, and the effective volume of the biochemical reaction tank is 125 L.

The present invention is also directed to a treatment and recovery device for bobbin paper production wastewater. The device sequentially comprises an adsorption tank, a balance tank and a biochemical reaction tank, wherein a water inlet and an aeration device are arranged at the bottoms of the adsorption tank and the biochemical reaction tank, and a sludge return pipe is connected between the adsorption tank and the biochemical reaction tank.

The present invention has the following advantages and effects:

(1) A two-stage treatment and recovery technology of bobbin paper production wastewater based on the aerobic granular sludge technique has the characteristics of low chemical addition amount, small footprint, short operating period and easy operation, adjustment and control. By adopting the aerobic granular sludge in an adsorption section to treat high-load waste slurry, efficient concentration of fiber type substances in the waste slurry can be realized, and resource type substances can be recovered. By adopting the aerobic granular sludge in a biochemical section to treat the effluent in the absorption section, the effluent can be stably discharged according to the standards.

(2) The biomass of the aerobic granular sludge in of the two-stage systems is obviously increased, and better sedimentation efficiency is kept. The adsorption capacities of the aerobic granular sludge on the fiber type substances and the protein type substances reach 710 mg/g MLSS and 140 mg/g MLSS respectively, thereby indicating that suspended solids in the bobbin paper production wastewater are effectively enriched so as to lay a foundation for further recycling. The concentrations of COD, NH4-N, TP and SS in the effluent in the biochemical section are 98 mg/L, 4.1 mg/L, 0.8 mg/L and 100 mg/L respectively, the removal rates of COD and SS are 98.8% and 96.2% respectively, and the effluent meets the corresponding discharge standards.

(3) The two-stage treatment and recovery technology of bobbin paper production wastewater based on the aerobic granular sludge technique is established, thereby effectively lowering the operating cost of waste slurry treatment, simplifying the operation, being favorable for recycling resource substances, and laying a foundation for constructing a resource-saving and environment-friendly treatment technology capable of saving energy and reducing consumption.

DETAILED DESCRIPTION

The present invention is described in detail below.

Example 1

Figure 1:
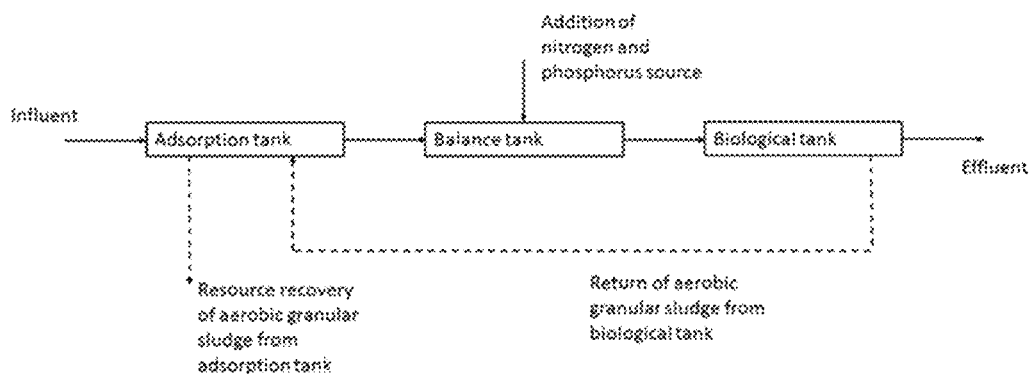
FIG. 1 shows a two-stage treatment and recovery technological process of bobbin paper production wastewater.

The two-stage treatment and recovery technological process of the bobbin paper production wastewater is as shown in FIG. 1. The first stage of treatment is an adsorption technology, the diameter of an adsorption reactor R1 is 40 cm, the height of the adsorption reactor R1 is 120 cm, and the effective volume of the adsorption reactor R1 is 500 L. The second stage of treatment is a biochemical reaction technology, the diameter of a biochemical reactor R2 is 20 cm, the height of the biochemical reactor R2 is 120 cm, and the effective volume of the biochemical reactor R2 is 125 L. Both the reactors R1 and R2 (SBR reactor) adopt a mode of bottom water feeding and bottom aeration, and a water outlet is formed in a position 50 cm from the bottom of the reactor. The hydraulic retention time of the reactors R1 and R2 is 1 h and 3 h respectively, and the dissolved oxygen of the reactors R1 and R2 is controlled at 0.2-0.8 mg/L and 2.0-3.0 mg/L respectively. $NH_4Cl$ and $K_2HPO_4$ are respectively added to the balance tank according to a ratio of COD:N:P=100:5:1 to perform nitrogen and phosphorus adjustment, thereby ensuring the microbial growth in the second stage of biochemical section.

The experimental waste slurry is taken from a papermaking enterprise, and annual average COD and SS concentrations are 8600 mg/L and 2600 mg/L respectively. The quality of the effluent refers to Discharge Standard of Water Pollutant for Pulp and Paper Industry (GB3544-2008) and Wastewater Quality Standards for Discharge to Municipal Sewers (CJ343-2010). The experimental aerobic granular sludge is taken from an aerobic granular sludge system for long-term treatment of municipal wastewater. The MLSS (mixed liquid suspended solids), MLVSS (mixed liquor volatile suspended solids) and SVI (sludge volume index) of the aerobic granular sludge are 7.1 mg/L, 3.5 mg/L and 57.0 ml/g respectively.

Figure 2:
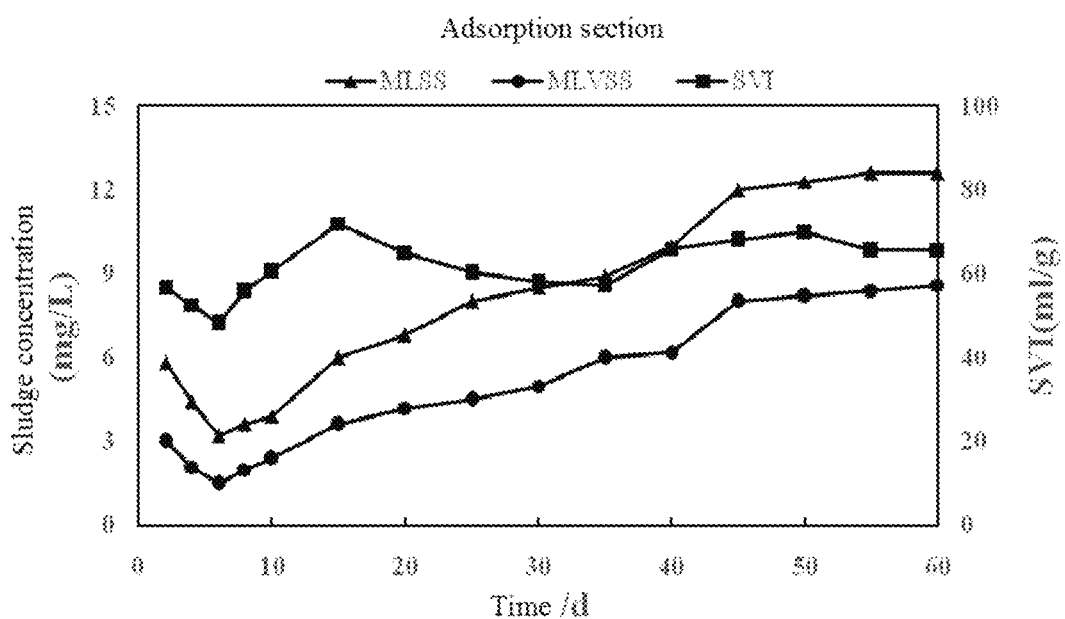
FIG. 2 shows a curve of change of biomass and sedimentation performance of aerobic granular sludge with time.

1. Operation Effect of Adsorption Section (1) Sedimentation Performance and Biomass of Sludge The aerobic granular sludge is utilized for adsorbing the suspended solids in the bobbin paper production wastewater in the R1. The biomass and the sedimentation performance of the aerobic granular sludge are as shown in FIG. 2. After the aerobic granular sludge is inoculated in the reactor for 10 d, due to higher organic load of influent and presence of organic substances such as rosin size and acrylic polyol, the biomass of the sludge is greatly reduced, but the change of the sedimentation performance of the sludge is smaller. The biomass of the sludge is gradually increased on the 15th day after the reactor is operated, and simultaneously, due to higher concentration of the suspended solids in the influent, a large amount of fiber type substances are adsorbed on the surface of the aerobic granular sludge, and the concentration of the organic substances in the sludge is greatly increased. The biomass of the MLSS and the biomass of the MLVSS in the sludge are 12.6 mg/L and 8.6 mg/L respectively on the 60th day after the reactor is operated, indicating that the suspended solids are effectively adsorbed on the surface of the aerobic granular sludge, but the SVI of the sludge is still kept between 60 ml/g and 70 ml/g, indicating that the aerobic granular sludge serving as an adsorbent of the suspended solids has a good adsorption effect.

(2) Adsorption Effect of Suspended Solids

Figure 3:
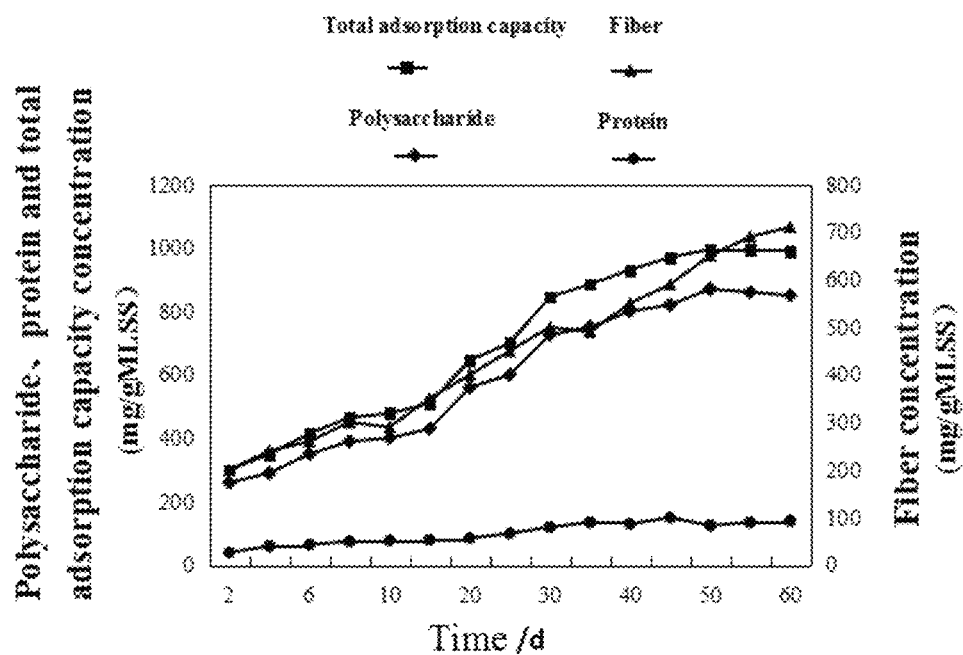
FIG. 3 shows adsorption capacities of the aerobic granular sludge on fiber type substances and protein type substances.

The bobbin paper production wastewater contains higher-concentration fiber and protein type substances, wherein the fiber type substances are dominant, and the concentration of the fiber type substances is about 725 mg/g MLSS. Due to the influence of the load and quality of influent, in the initial stage of operation of the reactor, the adsorption ability to the fiber type and protein type substances is poor, and the concentration is about 720 mg/g MLSS. With the operation of the reactor, the aerobic granular sludge gradually adapts to the environment, and the adsorption ability of the aerobic granular sludge to the fiber type and protein type substances is gradually increased. On the 60th day after the reactor is operated, the adsorption capacities of the aerobic particle sludge on the fiber type substances and the protein type substances reach 710 mg/g MLSS and 140 mg/g MLSS respectively (FIG. 3), indicating that the suspended solids in the bobbin paper production wastewater are effectively enriched so as to lay a foundation for further recycling. The total adsorption capacity refers to the total capacity of adsorption on polysaccharides (including cellulose) and the protein type substances by the aerobic granular sludge.

(3) Concentrations of COD and SS in Effluent

Figure 4:
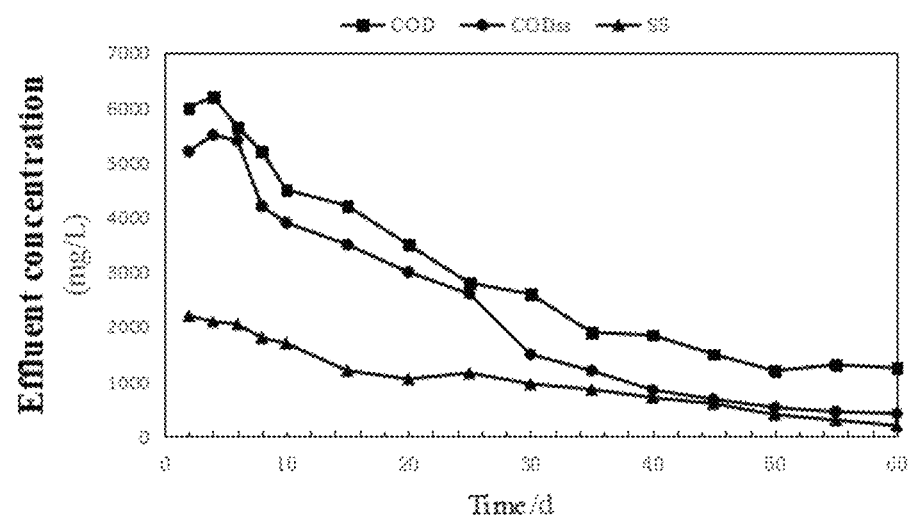
FIG. 4 shows removal effects of the aerobic granular sludge on COD and SS of the bobbin paper production wastewater in an adsorption section.

The removal effects of the aerobic granular sludge on COD and SS of the bobbin paper production wastewater in the adsorption section are as shown in FIG. 4. In the initial stage of operation of the reactor, the removal ability of the aerobic granular sludge to COD and SS in the influent is lower, and the COD and SS in the effluent is maintained at 4500 mg/L and 1700 mg/L or more. Subsequently, due to the enhanced adaptability of the aerobic granular sludge, the removal ability of the aerobic granular sludge to waste slurry pollutants is recovered, and the concentrations of COD and SS in the influent are gradually reduced. On the 60th day after the R1 is operated, the concentrations of COD and SS in the effluent in the absorption section are 1250 mg/L and 200 mg/L respectively. In addition, because the suspended solids mainly contain fiber type organic substances, when the suspended solids are adsorbed by the aerobic granular sludge, the concentration of CODss (COD of suspended solids) in the effluent is accordingly reduced. On the 60th day after the reactor is operated, the CODss of the effluent is only 420 mg/L, proving that the suspended solids are effectively enriched on the aerobic granular sludge.

2. Operation Effect of Biochemical Section

The nitrogen and phosphorus concentration in the bobbin paper production wastewater is relatively low, which is not favorable for growth of microorganisms in the sludge in the biochemical section, so that $NH_4Cl$ and $K_2HPO_4$ are added to the balance tank to ensure stable operation of the biochemical section.

(1) Sedimentation Performance and Biomass of Sludge

Figure 5:
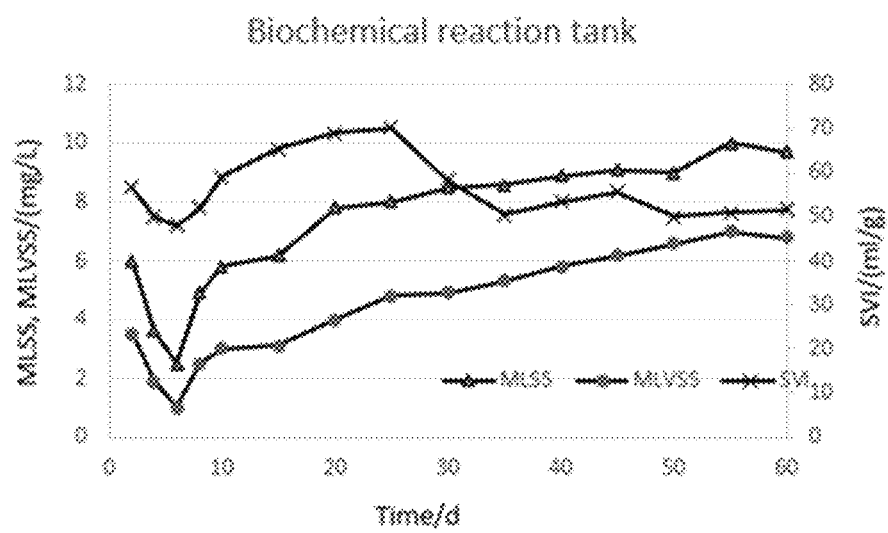
FIG. 5 shows change of biomass and sedimentation performance of the aerobic granular sludge after treatment on the effluent in the adsorption section by utilizing the aerobic granular sludge.

The aerobic granular sludge is utilized for treating the effluent in the absorption section, and the biomass and the sedimentation performance of the aerobic granular sludge are as shown in FIG. 5. Because the organic load of the influent is still higher than that of municipal wastewater, in the initial stage of operation of the reactor R2, the biomass of the aerobic granular sludge is reduced, but the aerobic granular sludge still has a better sedimentation effect. Compared with the aerobic granular sludge in the absorption section, the biomass of the aerobic granular sludge in the R2 recovers to the level of the inoculated sludge on about the 10th day, indicating that the aerobic granular sludge has a higher activity recovery ability under low load conditions than high load conditions. On the 60th day after the reactor is operated, the MLSS, MLVSS and SVI of the sludge are 9.7 mg/L, 6.8 mg/L and 51.7 ml/g respectively, indicating that the aerobic granular sludge better adapts to the conditions of the effluent in the absorption section and lays a foundation for stable standard discharge of the bobbin paper production wastewater.

(2) Pollutant Concentration of Effluent

Figure 6:
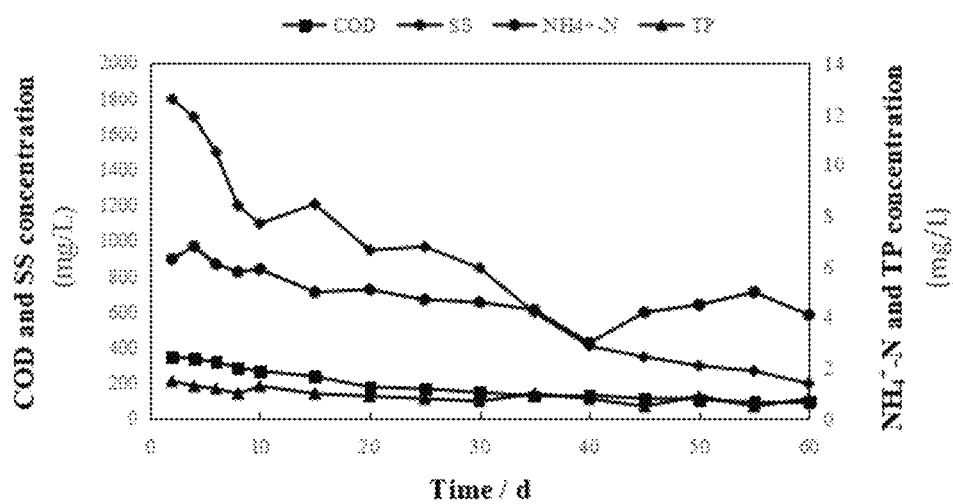
FIG. 6 shows change of pollutant concentration after treatment on the effluent in the adsorption section by utilizing the aerobic granular sludge.

FIG. 6 describes the change of the pollutant concentration after treatment on the effluent in the adsorption section by utilizing the aerobic granular sludge. It can be seen from the figure that with the operation of the reactor R2, the concentrations of COD, $NH_4^-N$, TP and SS in the effluent in the absorption section are gradually reduced. On the 60th day after the R2 is operated, the concentrations of COD, $NH_4^-N$, TP and SS in the effluent in the biochemical reaction section are 98 mg/L, 4.1 mg/L, 0.8 mg/L and 100 mg/L respectively, the removal rates of COD and SS are 98.8% and 96.2% respectively, and the effluent meets the corresponding discharge standards. However, during the operation of the reactor R2, COD removal and SS removal are different, COD is kept at a lower effluent concentration in the initial stage of operation of the reactor R2, and SS in the effluent is kept at a higher concentration in the initial stage of operation of the R2, indicating that the R2 which has longer hydraulic retention time and higher dissolved oxygen concentration is favorable for degradation of soluble COD in the influent. However, SS in the effluent in the absorption section mainly includes refractory organic substances, the hydraulic retention time is longer, and the dissolved oxygen concentration is higher, so that the decomposition and adsorption abilities of the aerobic granular sludge to SS are poor. However, on the 40th day after the R2 is operated, with the appearance of protozoa and metazoans in the reactor, SS in the effluent is gradually reduced and the effluent is discharged according to standards.

Example 2

The two-stage treatment and recovery technological process of the bobbin paper production wastewater is as shown in FIG. 1. A reactor in the example 2 is the same as that in the example 1.

Aerobic granular sludge is inoculated in an adsorption tank and a biochemical reaction tank, the MLSS, MLVSS and SVI are 7.1 mg/L, 3.5 mg/L and 57.0 mL/g respectively, the concentrations of COD and SS in the waste slurry of influent are 8200 mg/L and 2900 mg/L respectively, and a reaction is started. The bobbin paper production wastewater firstly enters the adsorption tank, so that suspended solids in the waste slurry are adsorbed by the aerobic granular sludge in the adsorption tank, then enters the balance tank, in which $NH_4Cl$ and $K_2HPO_4$ are respectively added according to a ratio of COD:N:P=100:5:1 to perform nitrogen and phosphorus adjustment, and then enters the biochemical reaction tank to be subjected to aerobic treatment under the action of the aerobic granular sludge, and the treated effluent is discharged.

The hydraulic retention time of the adsorption tank and the biochemical reaction tank is 1 h and 3 h respectively, and the dissolved oxygen of the adsorption tank and the biochemical reaction tank is respectively controlled at 0.5 mg/L and 2.5 mg/L. In the operation process, partial aerobic granular sludge in the adsorption tank is regularly taken out, and the sludge in the biochemical reaction tank is used for supplementing.

After 60 days of continuous operation, the removal rates of COD and SS are 98.1% and 95.5% respectively, and fiber type substances and the like are effectively recovered.

Comparative Example 1

An integrated aerobic granular sludge technology for treatment and recovery of bobbin paper production wastewater:

The adsorption tank is omitted, other conditions are not changed, and the bobbin paper production wastewater in which the concentrations of COD and SS are 8200 mg/L and 2900 mg/L respectively is directly added to the biochemical reaction tank to be treated.

After 60 days of operation, the removal rates of COD and SS are 35% and 47% respectively, and granular substances in the bobbin paper production wastewater can not be effectively adsorbed, thereby influencing the resource recovery effect.

This shows that by adopting a one-stage treatment technology of bobbin paper production wastewater, the removal of pollutants by the aerobic granular sludge is mainly based on absorption removal, the treatment ability to the pollutants is limited, and wastewater cannot be discharged according to the standards. Furthermore, because the aerobic granular sludge absorbs the granular substances in the bobbin paper production wastewater, metazoans tends to appear in the sludge, the aerobic granular sludge is crushed, the yield of the sludge is reduced, and the resource substances in the bobbin paper production wastewater cannot be recovered smoothly.

Comparative Example 2

Figure 7:
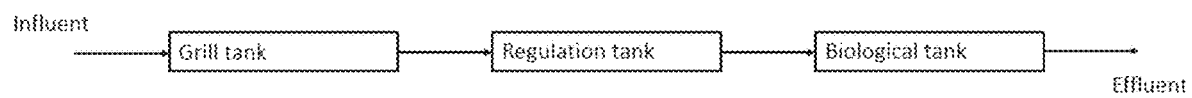
FIG. 7 shows removal effects of the technology of a comparative example 1 on COD and SS of the bobbin paper production wastewater.

Referring to the treatment technology in the example 1, the adsorption tank of the present invention is replaced with a grid tank disclosed by the patent CN205151892U, other conditions are not changed, and the specific technology is as shown in FIG. 7:

The concentrations of COD and SS in the bobbin paper production wastewater are 8200 mg/L and 2900 mg/L respectively. The waste slurry firstly enters the grid tank, so that larger granular substances in wastewater can be removed by the grid tank, and then, enters the balance tank to adjust and homogenize the water quality and the water flow. Then the wastewater enters the biochemical reaction tank, pollutants are degraded and removed under the action of microorganisms in the aerobic granular sludge.

After 60 days of continuous operation, the removal rates of COD and SS are 45% and 49% respectively, and granular substances in the bobbin paper production wastewater cannot be effectively adsorbed, thereby influencing the resource recovery effect. Because the grid distance of the grids is larger, the granular substances in the bobbin paper production wastewater cannot be effectively intercepted. Furthermore, because the function of the balance tank is mainly based on water balance and C/N/P coordination, it is also unable to exert the adsorption effect on the granular substances in the bobbin paper production wastewater.

What is claimed is:

1. A treatment and recovery method for bobbin paper production wastewater, comprising the following steps:
    inoculating an adsorption tank with aerobic granular sludge,
    inoculating a biochemical reaction tank with aerobic granular sludge,
    directing the bobbin paper production wastewater to firstly enter the adsorption tank,
    directing the bobbin paper production wastewater to secondly enter a balance tank, to be subjected to nitrogen and phosphorus adjustment,
    directing the bobbin paper production wastewater thirdly to enter the biochemical reaction tank, and
    discharging treated water;
    wherein the aerobic granular sludge in the adsorption tank is fully or partially removed and fibers and/or proteins are recovered therefrom, and then the aerobic granular sludge is recycled.

2. The method of claim 1, wherein an annual average COD and SS concentration of the bobbin paper production wastewater are 8200 to 9000 mg/L and 2300 to 2900 mg/L, respectively.

3. The method of claim 1, wherein dissolved oxygen in the adsorption tank and the biochemical tank is controlled at 0.2 to 0.8 mg/L and 2.0 to 3.0 mg/L, respectively.

4. The method of claim 1, wherein a hydraulic retention time of the adsorption tank and the biochemical tank is 1 hour and 3 hours, respectively.

5. The method of claim 1, wherein when the adsorption capacities of fibers and proteins in the aerobic granular sludge in the adsorption tank reach 710 mg/g MLSS and 140 mg/g MLSS or more respectively, then the aerobic granular sludge in the adsorption tank is fully or partially removed, and then, the aerobic granular sludge is supplemented with the biochemical tank sludge.

6. The method of claim 1, wherein $NH_4Cl$ and $K_2HPO_4$ are respectively added to the balance tank according to a ratio of COD:N:P equal to 100:5:1.

7. The method of claim 1, wherein the aerobic granular sludge is first allowed to react in the adsorption tank and the biochemical tank for a time length 40 to 60 days before directing the bobbin paper production wastewater into the adsorption tank.

8. The method of claim 7, wherein after reaction the bobbin paper production wastewater enters the adsorption tank, then enters the balance tank to be subjected to nitrogen and phosphorus adjustment, and then enters the biochemical tank to be treated;
    wherein dissolved oxygen in the adsorption tank and the biochemical tank is controlled at 0.2 to 0.8 mg/L and 2.0 to 3.0 mg/L, respectively;
    wherein the hydraulic retention time of the adsorption tank and the biochemical tank is 1 hour and 3 hours, respectively; and
    wherein nitrogen and phosphorus adjustment is performed in the balance tank according to a ratio of COD:N:P equal to 100:5:1.

* * * * *